Patented May 20, 1941

2,242,959

UNITED STATES PATENT OFFICE 2,242,959

ANTIFREEZE COMPOSITION

Cecil Robinson, Warminster, England, assignor to Patrick J. O'Connor, New York, N. Y.

No Drawing. Application February 11, 1939, Serial No. 255,855

5 Claims. (Cl. 252—75)

My invention relates to antifreeze compositions suitable for use in the radiator systems of internal combustion engines.

It is the general object of the invention to provide an antifreeze composition having a freezing point below the temperature usually encountered during cold weather, and which is inexpensive to manufacture and will not corrode or attack the metallic and non-metallic parts of a circulating system, particularly that of an automobile.

While my antifreeze composition is not limited in its use to the cooling system of an internal combustion engine, it being applicable to other and analogous uses, for example, as a cooling brine, it will, for purposes of illustration, be described in connection with the circulating system of an automobile.

It is well known that calcium chloride is extremely soluble in water, and by reason of such high solubility greatly depresses the freezing point of an aqueous solution containing such salt in high concentration. It has been recognized for a long time that strong solutions of calcium chloride would constitute an ideal antifreeze composition, since the salt is very cheap, were it not for the fact that it attacks and corrodes the metal parts constituting the circulating system, and for that reason it would appear to be unsuited for use in compositions of the type in question, and it has been so regarded.

I have found that casein has the peculiar action, when employed in conjunction with calcium chloride in an antifreeze composition, of inhibiting the corrosive action of the calcium chloride, or of modifying or protecting the surface of the metal so as to render it immune to the normal action of the calcium chloride, without affecting the high solubility and consequently the high freezing point depression characteristic of calcium chloride. I have found that by the addition of suitable proportions of casein, preferably of casein together with sugar, to a strong solution of calcium chloride in water, a highly efficient and inexpensive antifreeze composition can be produced which will not attack the metal of the circulating system.

The action of the casein and sugar on the calcium chloride is rather obscure, but it is possible that the casein combines with the calcium chloride to form organic complexes which have no corrosive action on iron and the like. On the other hand, the action of the casein may be purely the mechanical one of forming a very thin protective coating on the metallic parts. It is also possible that the casein acts to prevent hydrolysis of the calcium chloride; or it may be precipitated in the form of the above-mentioned protecting film upon the metal by any free acid that is formed. The sugar apparently serves to prevent the crystallization of calcium chloride from strong solutions when water is lost by evaporation, and prevents caking of the calcium chloride, especially when it comes in contact with the hot engine walls. There is reason to believe that the sugar forms a reaction product with some of the calcium chloride, and it is possible that this reaction product acts to prevent precipitation of calcium chloride, the sugar thus, in effect, increasing the solubility of the calcium chloride and preventing precipitation of crystals of the latter upon evaporation of some of the water.

It is to be understood that I do not stand committed to any of the theories above outlined. Whatever the true reason for the unexpected, non-corroding action of my improved composition, I have found by actual experiment that a calcium chloride antifreeze composition made in accordance with the present invention was able to withstand the lowest winter temperatures encountered in northern United States without freezing and without attacking any parts of the circulating system of an automobile.

A highly satisfactory formula in accordance with the invention is the following:

Calcium chloride, dry, technical (75%)
pounds__ 25
Cane sugar (brown) _____do____ 5
Casein (technical) _____ounces__ 5-15
Water_____gallons__ 5

The calcium chloride and cane sugar are mixed in the water until they go into solution, whereupon the casein is added and stirred until it becomes suspended in the mixture. This composition will withstand the lowest winter temperatures ordinarily met with in the United States. The concentration can be reduced where higher minimum winter temperatures prevail, as is well understood in the art. The cane sugar may be replaced by glucose, molasses, starch, and similar carbohydrates.

I claim:

1. An antifreeze composition containing, as the freezing-point depressant, calcium chloride, and, as an agent inhibiting the corrosive action of the calcium chloride, casein.

2. An antifreeze composition containing calcium chloride and casein in the proportion of about 25 pounds of the former to 5-15 ounces of the latter.

3. An antifreeze composition comprising a mixture of calcium chloride, a sugar, and casein.

4. An antifreeze composition comprising a mixture of approximately 25 pounds of calcium chloride, 5 pounds of sugar and 5-15 ounces of casein.

5. An antifreeze composition containing for each gallon of water, approximately 5 pounds of calcium chloride, 1 pound of sugar and 1-3 ounces of casein.

CECIL ROBINSON.